Figure 1:
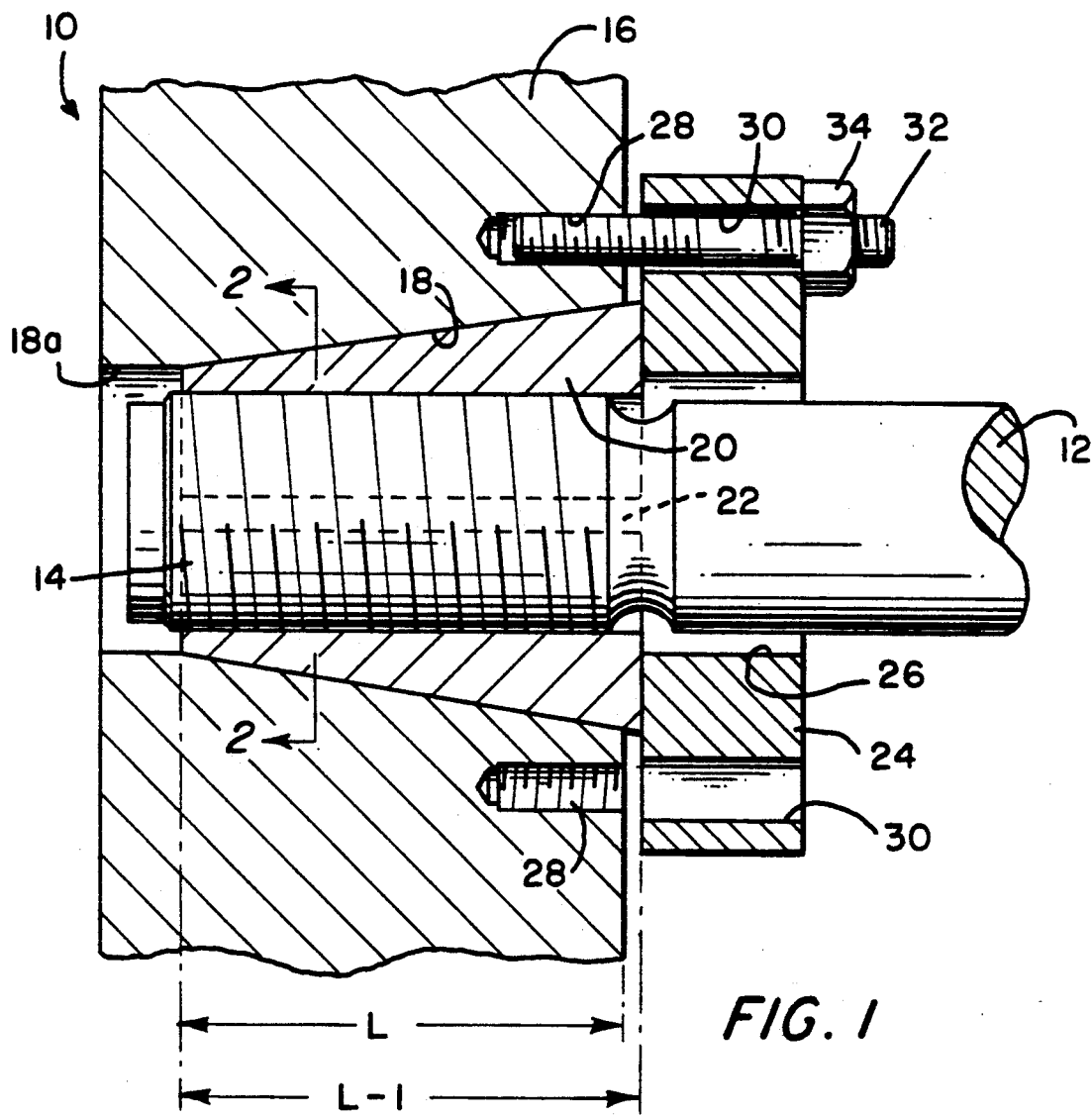

United States Patent [19]

Burdick, Jr.

[11] Patent Number: 5,161,928
[45] Date of Patent: Nov. 10, 1992

[54] AXIALLY-ADJUSTABLE ATTACHMENT OF A ROD TO A MEMBER

[75] Inventor: Waldo E. Burdick, Jr., Horseheads, N.Y.

[73] Assignee: Dresser-Rand Company, Corning, N.Y.

[21] Appl. No.: 699,106

[22] Filed: May 13, 1991

[51] Int. Cl.$^5$ .......................... F16B 39/36; F16B 37/08
[52] U.S. Cl. ...................................... 411/433; 411/14; 411/266; 411/270; 403/371
[58] Field of Search ............... 411/265, 266, 267, 432, 411/433, 270; 403/368, 370, 371

[56] References Cited

U.S. PATENT DOCUMENTS

| | | | |
|---|---|---|---|
| 827,346 | 7/1906 | Bubb | 403/371 |
| 1,907,806 | 5/1933 | Heintz | 403/370 |
| 2,384,953 | 9/1945 | Miller | 411/266 |
| 2,407,032 | 9/1946 | Myers | 403/370 |
| 2,998,731 | 9/1961 | Renner | 403/371 |
| 3,352,341 | 11/1967 | Schertz | 411/433 |
| 4,134,700 | 1/1979 | Nelson et al. | 403/371 |
| 4,425,816 | 1/1984 | Toyoda | 403/370 |
| 4,974,888 | 12/1990 | Childers | 411/433 |

FOREIGN PATENT DOCUMENTS

| | | | |
|---|---|---|---|
| 834143 | 8/1938 | France | 411/433 |
| 337159 | 9/1936 | Italy | 411/433 |
| 238288 | 2/1969 | U.S.S.R. | 411/266 |
| 250362 | 4/1926 | United Kingdom | 411/270 |

*Primary Examiner*—Neill R. Wilson
*Attorney, Agent, or Firm*—Bernard J. Murphy

[57] ABSTRACT

A piston rod, having a threaded end, is threadedly received in a split collar which is (a) internally threaded and (b) externally tapered. The collar is received in a tapered bore formed in a cross-head. The crosshead has a plurality of threaded holes formed therein to receive studs which penetrate a pressure plate. Nuts secured to ends of the studs draw the plate against the collar to cause its threads to fully engage the threads of the rod end, and secure the collar in place. The rod, of course, can be turned in the collar, threadedly to adjust its axial positioning in the collar.

3 Claims, 1 Drawing Sheet

AXIALLY-ADJUSTABLE ATTACHMENT OF A ROD TO A MEMBER

This invention pertains to arrangements for attaching a rod to another member, and in particular to an attachment of a rod to a member which accommodates for an axial adjustment of the rod.

Attachments of rods to other members are well known in the prior art, and quite typical thereof is the "Rod-Piston Connection" disclosed in U.S. Pat. No. 4,815,360, issued to Albert Winterle, on Mar. 28, 1989.

In the aforesaid patent, as in other such arrangements, a split collar is employed to clamp an end of the piston rod to a piston head, and a threaded bushing is threadedly engaged with a threaded bore in the piston head to clamp the split collar fast about the piston rod. The collar has internal, parallel grooves which mate with parallel grooves on the end of the rod.

The use of such known attachment arrangements are not acceptable where, for instance, it is desired to attach a piston rod to a crosshead in a reciprocating-piston machine. In order that the piston end clearance can be precisely set, it is necessary that the attachment arrangement accommodate for an axial adjustment of the rod in the member to which it is attached. Then, following the requisite adjustment, the attachment arrangement can be torqued up tightly.

It is an object of this invention to set forth just such a desired, axially-adjustable attachment of a rod to a member, in which the rod can be a piston rod, and the member can be a crosshead, by way of example.

It is particularly an object of this invention to disclose an axially-adjustable attachment of a rod to a member, comprising a rod having a threaded end; a member having a tapered bore formed therein; an externally-tapered, internally threaded, and longitudinally split collar (a) threadedly engaged with said end of said rod, and (b) set in said bore; a plate engaged with an end of said collar; and means fastening said plate to said member.

Figure 2:
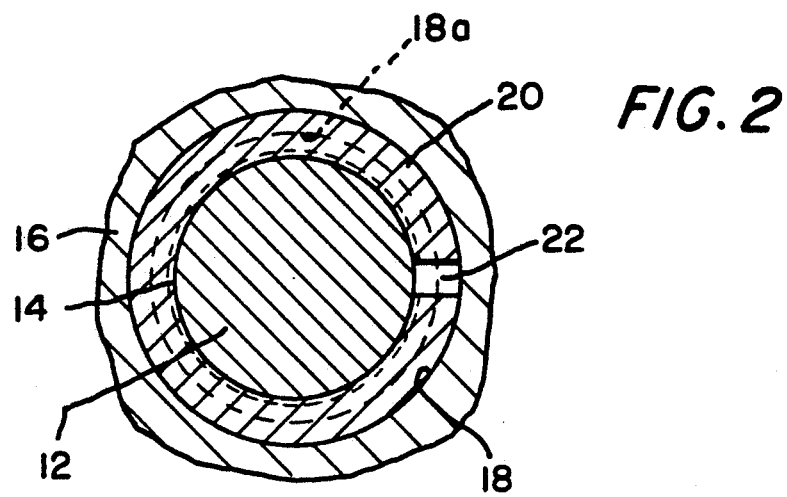

Further objects of this invention, as well as the novel features thereof, will become apparent from the following description, taken in conjunction with the accompanying figures, in which:

FIG. 1 is an axial cross-section, showing a portion of a piston rod attached to a portion of a crosshead in accordance with an embodiment of the invention; and FIG. 2 is a cross-sectional view of the split collar, the same taken along section 2—2 of FIG. 1.

As shown in the Figures, the novel attachment 10 comprises a rod 12, which may be a piston rod, having a threaded end 14 and a member 16, which may be a crosshead, having a throughgoing bore 18 formed therein. A major portion of the bore 18 is tapered. Set within the bore 18 is a collar 20; collar 20 has an axially-extending split 22 formed therein, is internally threaded, and has an outer taper which mates with the taper of bore 18.

The threaded end 14 of the rod 12 is threadedly engaged with the internal threads of the collar 20. A pressure plate 24, having a cental aperture 26, is set against an end of the collar 20. The member 16 has a plurality of tapped holes 28 formed therein, and the plate 24 has a corresponding plurality of bolt holes 30 formed therein. The latter are aligned with the tapped holes 28. Studs 32 (only one is shown) are fastened in the tapped holes 28 and pentrate the bolt holes 30. Nuts (only one is shown) 34 are threaded onto the outer ends of the studs 32 to bear against the plate 24.

At assembly, the threaded end of the rod 12 is screwed into the collar 20 to a depth which provides a proper, precise end clearance of the piston (not shown) at the opposite end thereof within its cylinder (not shown). Clearly, the rod can be turned, clockwise and counter-clockwise, in the collar 20, until the clearance-required depth is achieved. Then, the nuts 34 are torqued up tightly to force the collar 20 to contract and take up the pitch line clearance in the rod threads. The pressure plate 24 forces the collar into a fully nested disposition in the bore 18, and secures the collar 20 therein; too, the full thread-to-thread engagement of the rod 12 and collar 20 secures the rod 20 in place.

The bore 18 has a tapered length "L", whereas the collar 20 is tapered fully along the length "L-1". A short length 18a, of bore 18 has a constant diameter; this serves to provide a visual indication of a sufficiency of travel of the collar within the bore 18 of member 16; it provides a demarcation for the travel of the collar 20 into the bore 18. Therefore, when the leading end of the collar 20 has succeeded to substantial alignment with the innermost end of length 18a, it is a visual indication that the nuts 34 have been sufficiently torqued, collar 20 is securely engaged with the rod 12, and further travel of the collar 20, i.e., into length 18a, is not to be attempted. Consequently, the collar 20 maintains a portion thereof in projecting extension from the member 16. It is against this portion which the pressure plate 24 bears; the pressure plate 24 keeps a spaced apart relationship with the member 16.

As shown, the taper, of both the collar 20 and the bore 18, is shallow. Consequently it is self-releasing, upon the nuts 34 being loosened. This is especially beneficial, if there should be a need to make final adjustments of the depth of the rod 12 in the collar 20.

While I have described my invention in connection with a specific embodiment thereof, it is to be clearly understood that this is done only by way of example, and not as a limitation to the scope of the invention as set forth in the objects thereof, and in the appended claims.

I claim:

1. An axially-adjustable attachment of a rod to a member, comprising:
    a rod having a threaded end;
    a member having a tapered bore formed therein;
    an externally-tapered, internally threaded, and longitudinally split collar (a) threadedly engaged with said end of said rod, and (b) set in said bore;
    a plate set against an outermost surface of said collar; and
    means fastening said plate (a) only to said member, and (b) in a spaced-apart relationship to said member; wherein
    said bore (a) is tapered only along a given length thereof, and (b) has a short length of constant diameter, which short length of constant diameter, upon a leading end of said collar coming into substantial alignment with an innermost end of said short length, provides a visual indication that said collar is in its fully optimum setting within said bore.

2. An axially-adjustable attachment of a rod to a member, according to claim 1, wherein:
    said member has tapped holes formed therein;
    said plate comprises an annulus having a plurality of bolt holes formed therein;

said bolt holes are in alignment with said tapped holes; and said fastening means comprises (a) studs fastened in said tapped holes, and in penetration of said bolt holes, and (b) nuts fastened onto said studs and bearing against said annulus.

3. An axially-adjustable attachment of a rod to a member, according to claim 1, wherein:

a portion of said collar extends outwardly from said bore.

* * * * *